United States Patent
Ock et al.

(10) Patent No.: US 11,601,843 B2
(45) Date of Patent: Mar. 7, 2023

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Jinwoo Ock, Suwon-si (KR); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/224,439

(22) Filed: Apr. 7, 2021

(65) Prior Publication Data

US 2021/0321290 A1    Oct. 14, 2021

(30) Foreign Application Priority Data

Apr. 9, 2020    (KR) .......................... 10-2020-0043659

(51) Int. Cl.
*H04W 28/02*    (2009.01)
*H04W 28/06*    (2009.01)

(52) U.S. Cl.
CPC ... *H04W 28/0273* (2013.01); *H04W 28/0263* (2013.01); *H04W 28/0268* (2013.01); *H04W 28/06* (2013.01)

(58) Field of Classification Search
CPC ......... H04W 28/0273; H04W 28/0263; H04W 28/0268; H04W 28/06; H04W 76/22; H04W 28/0252; H04W 76/20
See application file for complete search history.

(56) References Cited

U.S. PATENT DOCUMENTS

2021/0160730 A1* 5/2021 Fiorani ............. H04W 28/0268
2021/0176676 A1* 6/2021 Yang ................. H04W 36/0083

FOREIGN PATENT DOCUMENTS

KR    10-2021-0020267 A    2/2021

OTHER PUBLICATIONS

Li et al, "Micro-Service-Based Radio Access Network", China Communication Magazine, Mar. 2022 (Year: 2022).*
Nayak et al, "A Centralized SDN Architecture for the 5G Cellular Network", Jan. 2018 (Year: 2018).*

* cited by examiner

*Primary Examiner* — Omer S Mian
(74) *Attorney, Agent, or Firm* — Jefferson IP Law, LLP

(57) ABSTRACT

A method performed by a base station in a wireless communication system is provided. The method includes transmitting, by a control plane (CP) of a centralized unit (CU) of the base station, a bearer context modification request message to a user plane (UP) of the CU of the base station, wherein the bearer context modification request message includes information associated with a request for a packet data convergence protocol (PDCP) sequence number (SN) status, and transmitting, by the UP of the CU of the base station, based on the bearer context modification request message, a bearer context modification response message to the CP of the CU of the base station, wherein the bearer context modification response message includes information associated with the PDCP SN status and information associated with at least one QoS flow, of which a service data adaptation protocol (SDAP) end marker is not received by the UP of the CU.

20 Claims, 14 Drawing Sheets

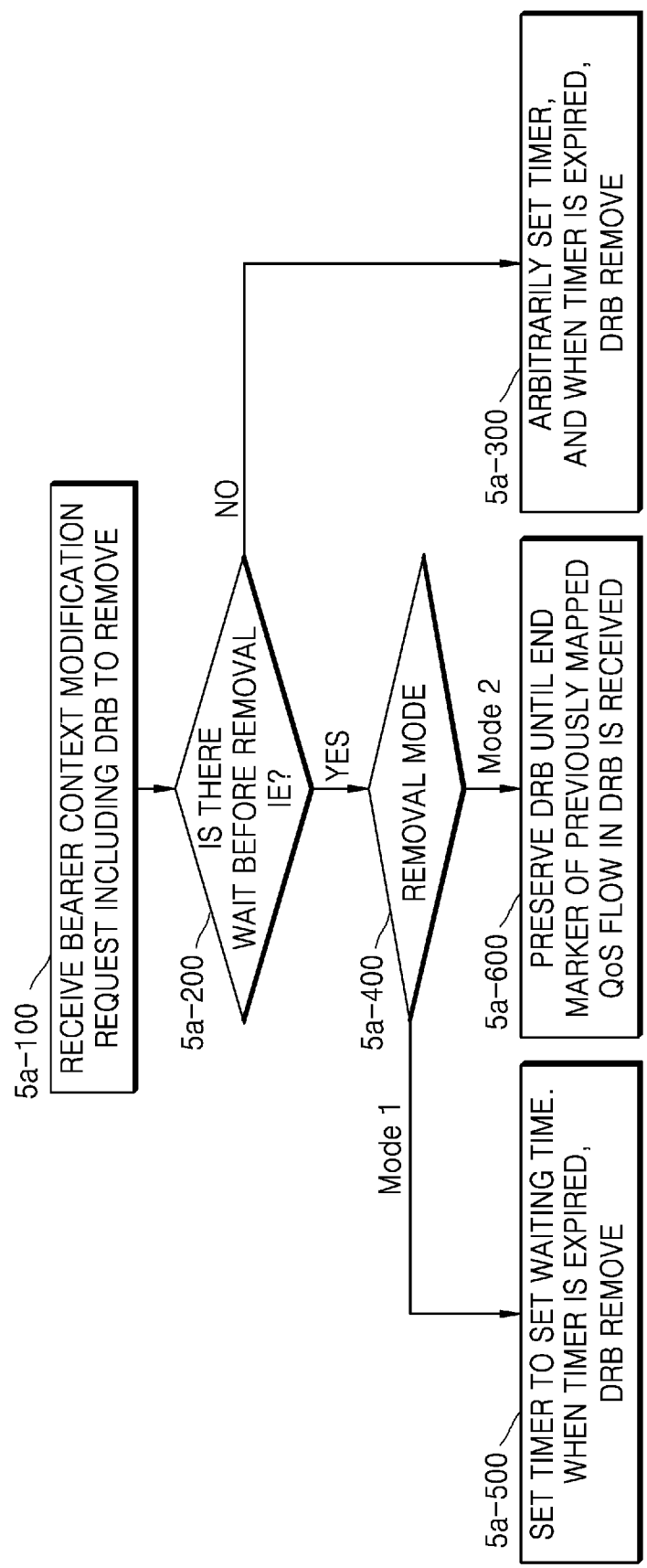

FIG. 6

| >DRB To Remove List | 0..1 | | | |
|---|---|---|---|---|
| >>DRB To Remove Item | 1..<maxnoof DRBs> | | | |
| >>>DRB ID | M | 9.3.1.16 | | |
| >>>Wait Before Removal | O | | | |
| >>>>CHOICE Mode 1 | O | | | |
| >>>>>Waiting time | O | | 0..maxwaitingTime | |
| >>>>Mode 2 | | | Mode 2 indicates removal after EM is received | |
| >S-NSSAI | O | 9.3.1.9 | | YES | reject |

[A] DRB TO REMOVE LIST IE IN BEARER CONTEXT MODIFICATION REQUEST MESSAGE

| DRB To Be Released List | 0..1 | | | YES | reject |
|---|---|---|---|---|---|
| >DRB to Be Released Item IES | 1..<maxnoof DRBs> | | | EACH | reject |
| >>DRB ID | M | 9.3.1.8 | | | |
| >>>Wait Before Release | O | | | | |
| >>>>CHOICE Mode 1 | O | | | | |
| >>>>>Waiting time | O | | 0..maxwaitingTime | | |
| >>>>Mode 2 | O | | Mode 2 indicates release after EM is received | | |

[B] DRB TO RELEASE LIST IE IN UE CONTEXT MODIFICATION REQUEST MESSAGE

FIG. 8

| IE/Group Name | Pressnce | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| CHOICE System | M | | | | YES | reject |
| >E-UTRAN | | | | | | |
| >>DRB To Modify List | O | | DRB Required To Modify List E-UTRAN 9.3.3.21 | | YES | reject |
| >>DRB To Remove List | O | | DRB Required To Remove List 9.3.3.22 | | YES | reject |
| >NG-RAN | | | | | | |
| >>PDU Session Resource To Modify List | O | | PDU Session Resource Required To Modify List 9.3.3.23 | | YES | reject |
| >>PDU Session Resource To Remove List | O | | 9.3.3.12 | | YES | reject |
| >>End Mark Received | | | | | | |
| >>>QoS Flow ID | O | | | | | |

| IE/Group Name | Presence | Range | IE type and reference | Semantics description |
|---|---|---|---|---|
| PDU Session Resource Modified Item | | 1..<maxnoof PDUSession Resource> | | |
| >PDU Session ID | M | | 9.3.1.21 | |
| >NG DL UP Transport Layer Information | O | | UP Transport Layer Information 9.3.2.1 | |
| >Security Result | O | | 9.3.1.52 | |
| >PDU Session Data Forwarding Information Response | O | | Data Forwarding Information 9.3.2.6 | |
| >DRB Setup List | | 0..1 | | |
| >>DRB Setup Item | | 1..<maxnoof DRBs> | | |
| >>>DRB ID | M | | 9.3.1.16 | |
| >>>DRB Data forwarding information Response | O | | Data Forwarding Information 9.3.2.6 | |
| >>>UL UP Parameters | M | | UP Parameters 9.3.1.13 | |
| >>>Flow Setup List | M | | QoS Flow List 9.3.1.12 | |
| >>>Flow Failed List | O | | Flow Failed List 9.3.1.45 | |
| >DRB Failed List | | 0..1 | | |
| >>DRB Failed Item | | 1..<maxnoof DRBs> | | |
| >>>DRB ID | M | | 9.3.1.16 | |
| >>>Cause | M | | 9.3.1.2 | |
| >DRB Modified List | | 0..1 | | |
| >>DRB Modified Item | | 1..<maxnoof DRBs> | | |
| >>>DRB ID | M | | 9.3.1.16 | |
| >>>UL UP Parameters | O | | UP Parameters 9.3.1.13 | Carries the UL UP parameters. |
| >>>PDCP SN Status Information | O | | 9.3.1.58 | Provides PDCP SN Status to the target gNB-CU-UP |
| >>>Flow Setup List | O | | Qos Flow List 9.3.1.12 | |
| >>>Flow Failed List | O | | Flow Failed List 9.3.1.45 | |
| >>>Old QoS Flow List-UL End Marker expected | O | | Qos Flow List 9.3.1.12 | Indicates that the source gNB-CU-UP has not yet received SDAP end markers after the source gNB-CU-CP initiated QoS flow re-mapping |
| >DRB Failed To Modify List | | 0..1 | | |
| >>DRB Failed To Modify Item | | 1..<maxnoof DRBs> | | |
| >>>DRB ID | M | | 9.3.1.16 | |
| >>>Cause | M | | 9.3.1.2 | |

11-100

METHOD AND APPARATUS FOR TRANSMITTING AND RECEIVING DATA IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0043659, filed on Apr. 9, 2020, in the Korean Intellectual Property Office, the disclosure of which is incorporated by reference herein in its entirety.

BACKGROUND

1. Field

The disclosure relates to a method and apparatus for transmitting or receiving data in a wireless communication system.

2. Description of Related Art

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, the 5G communication systems are being developed to be implemented in an ultra-high frequency band (millimeter wave (mmWave)), e.g., a band of 60 gigahertz (GHz). In order to reduce the path loss of radio waves in such a super-high frequency band and to increase a transmission distance of radio waves in the 5G communication systems, various technologies have been discussed and are being studied, for example: beamforming, massive multiple-input multiple-output (massive MIMO), full dimensional MIMO (FD-MIMO), array antennas, analog beamforming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may also be an example of convergence of 5G communication technology and IoT technology.

As described above, various services may be provided due to the development of wireless communication systems, and thus, there is a need for methods of easily providing such services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for effectively providing services in a mobile communication system.

Additional aspects will be set forth in part in the description which follows and, in part, will be apparent from the description, or may be learned by practice of the presented embodiments.

In accordance with an aspect of the disclosure, a method performed by a base station in a wireless communication system is provided. The method includes transmitting, by a control plane (CP) of a centralized unit (CU) of the base station, a bearer context modification request message to a user plane (UP) of the CU of the base station, wherein the bearer context modification request message includes information associated with a request for a packet data convergence protocol (PDCP) sequence number (SN) status, and transmitting, by the UP of the CU of the base station, based on the bearer context modification request message, a bearer context modification response message to the CP of the CU of the base station, wherein the bearer context modification response message includes information associated with the PDCP SN status and information associated with at least one quality of service (QoS) flow, of which a service data adaptation protocol (SDAP) end marker is not received by the UP of the CU.

In accordance with another aspect of the disclosure, a base station in a wireless communication system is provided. The base station includes a transceiver, and at least one processor configured to transmit, by a control plane (CP) of a centralized unit (CU) of the base station, a bearer context modification request message to a user plane (UP) of the CU of the base station, wherein the bearer context modification request message includes information associated with a request for a packet data convergence protocol (PDCP) sequence number (SN) status, and transmit, by the UP of the CU of the base station, based on the bearer context modification request message, a bearer context modification response message to the CP of the CU of the base station, wherein the bearer context modification response message includes information associated with the PDCP SN status and information associated with at least one quality of service (QoS) flow, of which a service data adaptation protocol (SDAP) end marker is not received by the UP of the CU of the base station.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5A illustrates an operation of a centralized unit (CU)-user plane (UP) in a first method for solving a problem that may occur in a QoS flow remapping method, according to an embodiment of the disclosure;

FIG. 6 illustrates a message that is newly defined to define an operation according to the first method, according to an embodiment of the disclosure;

FIG. 8 illustrates an information element (IE) that is newly defined to notify, by a CU-UP, a CU-CP about whether an end marker is received, according to an embodiment of the disclosure;

FIG. 11 illustrates a second method for solving a problem that may occur when a handover takes place during remapping of a QoS flow, according to an embodiment of the disclosure;

Throughout the drawings, like reference numerals will be understood to refer to like parts, components, and structures.

DETAILED DESCRIPTION

Figure 1:
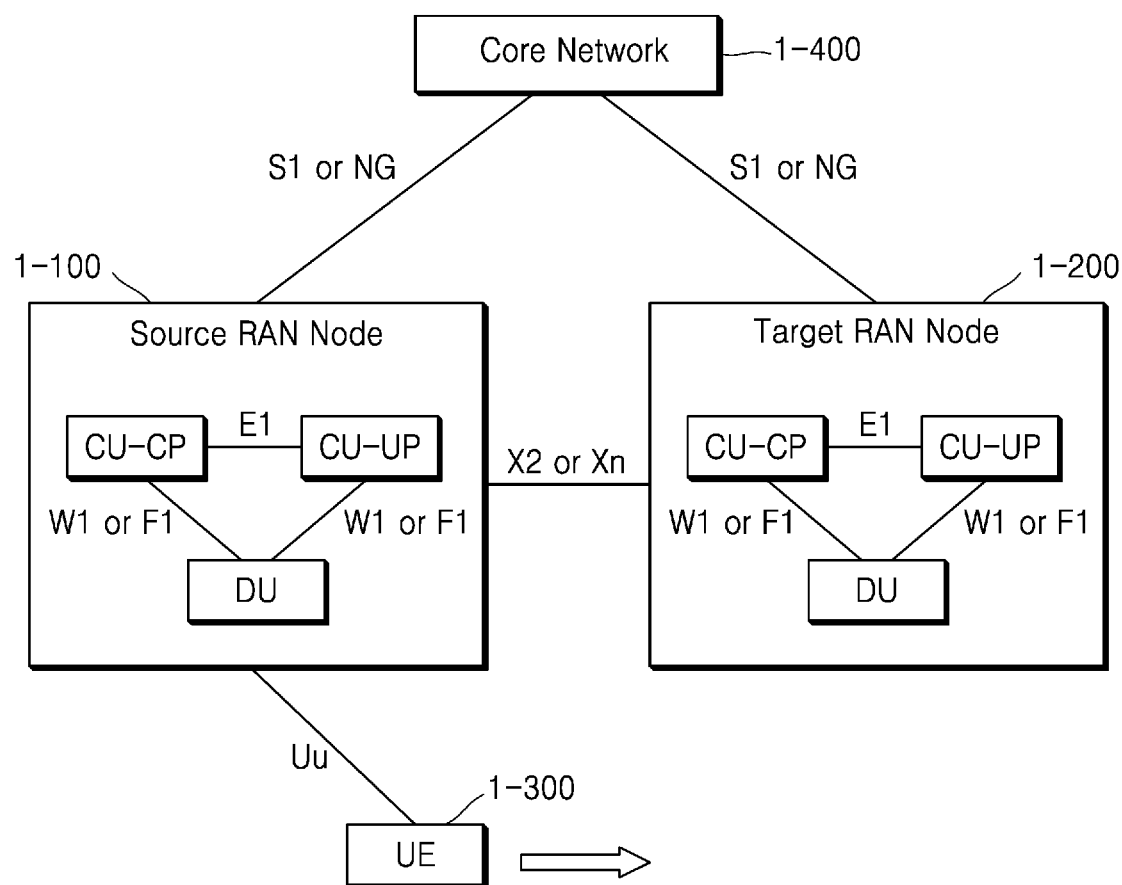
FIG. 1 is a diagram illustrating an example of a next-generation mobile communication system structure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments of the disclosure set forth herein; rather, these embodiments of the disclosure are provided so that this disclosure will be thorough and complete, and will fully convey the concept of the disclosure to those skilled in the art. The scope of the disclosure is only defined in the claims. Throughout the specification, like reference numerals or characters refer to like elements.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-executable or computer-readable memory that may direct a computer or other programmable data processing equipment to function in a particular manner, such that the instructions stored in the computer-executable or computer-readable memory produce a manufactured article including instruction means that perform the functions specified in the flowchart block(s). The computer program instructions may also be loaded onto a computer or other programmable data processing equipment to cause a series of operations to be performed on the computer or other programmable data processing equipment to produce a computer-executable process such that the instructions that are executed on the computer or other programmable data processing equipment provide operations for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit" or '~er(or)' used herein denotes a software element or a hardware element such as a field-programmable gate array (FPGA) or an application-specific integrated circuit (ASIC), and performs a certain function. However, the term 'unit' or '~er(or)' is not limited to software or hardware. The term 'unit' or '~er(or)' may be configured to be included in an addressable storage medium or to reproduce one or more processors. Thus, the term 'unit' or '~er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers(ors)' may be combined into a smaller number of components and 'units' or '~ers(ors)' or may be further separated into additional components and 'units' or '~ers(ors)'. In addition, the components and 'units' or '~ers (ors)' may be implemented to operate one or more central processing units (CPUs) in a device or a secure multimedia card. Also, 'units' or '~ers(ors)' may include at least one processor.

Hereinafter, embodiments of the disclosure will be described with reference to accompanying drawings.

In the following description, the term for identifying an access node, the term referring to a network entity, the term referring to messages, the term referring to an interface between network objects, and the term referring to various identification information, and the like are examples provided for convenience of description. However, the disclosure is not limited by the following terms, and other terms having equivalent technical meanings may be used.

Hereinafter, for convenience of description, in the disclosure, the terms and names defined in the 3rd Generation Partnership Project Long Term Evolution (3GPP LTE) specification are used. However, the disclosure is not limited by the terms and names, but may also be applied to systems complying with other specifications. In particular, the disclosure may be applied to a 3GPP New Radio (NR, 5th Generation mobile communication standards). In the disclosure, 'eNB' may be interchangeably used with 'gNB' for convenience of description. That is, a base station described as an 'eNB' may denote a 'gNB'. Also, the term 'terminal' may indicate not only mobile phones, NarrowBand-Internet of Things (NB-IoT) devices, or sensors but also other wireless communication devices.

Hereinafter, a base station is an entity that assigns resources of a terminal, and may be at least one of a gNode B, an eNode B, a Node B, a base station (BS), a radio access unit, a base station controller, or a node on a network. However, the terminal is not limited to the above examples.

In addition, in the detailed description of the embodiments of the disclosure, a new radio access network (RAN), and a packet core (5G System, or 5G Core Network, or Next Generation (NG) Core) of the 5G mobile communication standards specified by 3GPP, a specification standardization organization, are mainly described. However, the gist of the disclosure may also apply to other communication systems with similar technical backgrounds through slight modification without departing from the scope of the disclosure, which can be implemented based on the judgment of one of ordinary skill in the art of the disclosure.

The disclosure relates to a method of supporting QoS flow remapping (Method for Handling QoS Flow Re-mapping).

FIG. 1 is a diagram illustrating an example of a next-generation mobile communication system structure according to an embodiment of the disclosure. That is, FIG. 1 illustrates an example of a next-generation mobile communication system structure to which the embodiments of the disclosure may be applied.

Referring to FIG. 1, a RAN Node 1-100 or 1-200 specified in the above structure may refer to a mobile communication base station such as an LTE eNB or an NR gNB connected to a mobile communication core network such as Evolved Packet Core (EPC) or a 5G Core Network (5GC). The 5GC may be a Core Network 1-400 in FIG. 1. In addition, the RAN Node 1-100 or 1-200 may be divided into a Centralized Unit (CU) and a Distributed Unit (DU), and the CU may be divided again into a CU-Control Plane (CP) and a CU-User Plane (UP). Referring to FIG. 1, the RAN Node 1-100 may refer to a source RAN node, and the RAN Node 1-200 may refer to a target RAN node.

According to an embodiment of the disclosure, each RAN Node may be configured with one or more CU-CPs, one or more CU-UPs, and one or more DUs. In addition, a CU-CP, a CU-UP, and a DU constituting a RAN node may be configured together. For example, a RAN node may be configured with a CU, in which a CU-CP and a CU-UP are implemented together, and a DU. In another RAN node, a CU-CP and a DU may be implemented together, and a CU-UP may be configured separately. Another RAN Node may be configured in the form of an integrated base station in which a CU-CP, a CU-UP, and a DU are implemented together. A RAN node may also be configured with any other combination than the above-described examples.

According to an embodiment of the disclosure, a CU and a DU may respectively support base station functions that are different from each other. For example, a CU may support a Radio Resource Control (RRC)/Packet Data Convergence Protocol (PDCP) layer, and a DU may support a Radio Link Control (RLC)/Medium Access Control (MAC)/Physical layer (PHY)/Radio Frequency (RF) layer. In addition, the CU and the DU may be connected to each other through an interface between functions within a base station, such as a W1 or F1 interface.

According to an embodiment of the disclosure, a CU may be divided into a CU-CP and a CU-UP. For example, a RRC/PDCP (for RRC) layer may be supported in a CU-CP, a PDCP (for user data transmission) layer may be supported in a CU-UP, and the CU-CP and the CU-UP may be connected to each other through an interface between functions within a base station, such as an E1 interface.

According to an embodiment of the disclosure, base stations may be in an integrated structure or a separate structure, such that connection between integrated structure base stations, between separate base stations, or between an integrated structure base station and a separate structure base station may be made. RAN nodes may be connected to each other via an interface between base stations, such as an X2 or Xn interface. In addition, a RAN node and a core network may be connected through an interface between a base station and a core network, such as an S1 or NG Interface. The technology proposed in the disclosure may be applied when a handover occurs between base stations while the terminal 1-300 connected to a source RAN node moves to a target RAN node, regardless of a type of a base station, whether an integrated base station or a separate base station.

Figure 2:
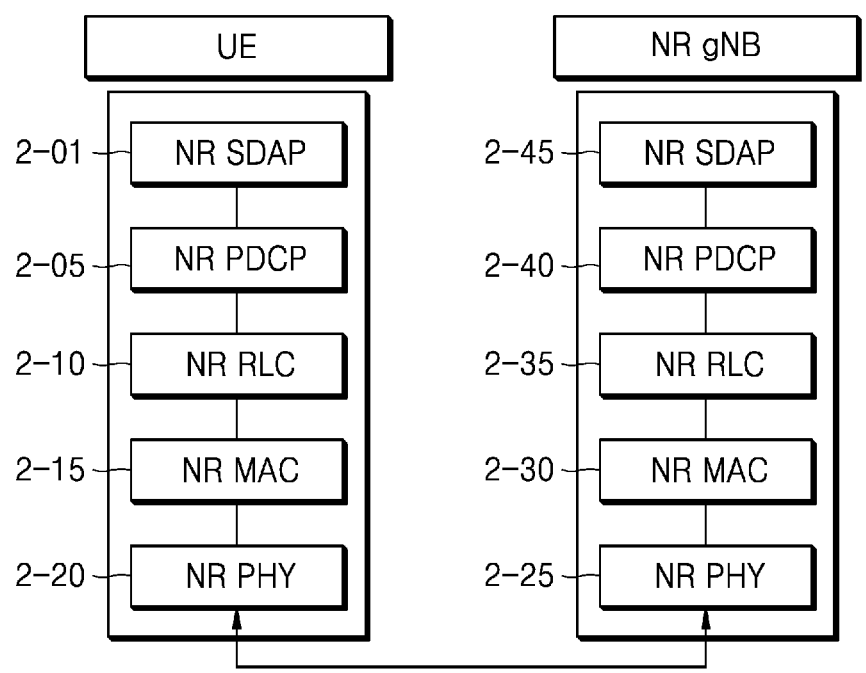
FIG. 2 is a diagram illustrating a wireless protocol structure of a next-generation mobile communication system according to an embodiment of the disclosure.

FIG. 2 is a diagram illustrating a wireless protocol structure of a next-generation mobile communication system according to an embodiment of the disclosure. That is, FIG. 2 is a diagram illustrating a wireless protocol structure of a next-generation mobile communication system to which the embodiments of the disclosure may be applied.

Referring to FIG. 2, in each of a terminal and an NR base station (e.g., NR gNB), a wireless protocol of the next-generation mobile communication system may be configured with an NR service data adaptation protocol (SDAP) layer 2-01/2-45, an NR PDCP layer 2-05/2-40, an NR RLC 2-10/2-35, an NR MAC layer 2-15/2-30, and an NR PHY layer 2-20/2-25.

The major functions of the NR SDAP layer 2-01 or 2-45 may include some of functions below.
　transfer of user plane data
　mapping between a QoS flow and a data bearer (DRB) for both downlink (DL) and uplink (UL)
　marking QoS flow ID in both DL and UL packets
　mapping reflective QoS flow to DRB for UL SDAP PDUs With respect to an SDAP layer, a terminal may be configured to determine whether to use a header of the SDAP layer or to use functions of the SDAP layer, via a radio resource control (RRC) message, for each PDCP layer, each bearer, or logical channel. When the SDAP header is configured, a 1-bit non-access stratum (NAS) reflective QoS configuration indicator and a 1-bit access stratum (AS) reflective QoS configuration indicator of the SDAP header may indicate to the UE to update or reconfigure mapping information between a QoS flow and a data bearer for both UL and DL. The SDAP header may include QoS flow ID information indicating a QoS. QoS information may be used as data processing priority, scheduling information, or the like, to support proper provision of services.

The major functions of the NR PDCP layer 2-05 or 2-40 may include some of functions below.
　Header compression and decompression: Robust Header Compression (ROHC) only
　Transfer of user data
　In-sequence delivery of upper layer PDUs
　Out-of-sequence delivery of upper layer PDUs
　PDCP PDU reordering for reception
　Duplicate detection of lower layer SDUs
　Retransmission of PDCP SDUs
　Ciphering and deciphering
　Timer-based SDU discard in uplink In the above description, the reordering function of the NR PDCP layer 2-05 or 2-40 may indicate a function of reordering PDCP PDUs received in a lower layer in order based on PDCP sequence numbers (SN). The reordering function of the NR PDCP layer 2-05 or 2-40 may include a function of transferring data to an upper layer in a reordered order. Alternatively, the reordering function of the NR PDCP layer 2-05 or 2-40 may include a function of directly transferring data without considering the order. In addition, the reordering function of the NR PDCP layer 2-05 or 2-40 may have a function of reordering the order and recording lost PDCP PDUs, and may include a function of reporting status of the lost PDCP PDUs to a transmitting side, and requesting retransmission of the lost PDCP PDUs.

The major functions of the NR RLC layer 2-10 or 2-35 may include some of functions below.
　Transfer of upper layer PDUs
　In-sequence delivery of upper layer PDUs
　Out-of-sequence delivery of upper layer PDUs
　ARQ (Error correction through ARQ)
　Concatenation, segmentation, and reassembly of RLC SDUs
　Re-segmentation of RLC data PDUs
　Reordering of RLC data PDUs
　Duplicate detection
　Protocol error detection
　RLC SDU discard
　RLC re-establishment In the above description, an in-sequence delivery function of an NR RLC layer 2-10 or 2-35 may indicate a function of transferring RLC SDUs received from a lower layer to an upper layer in order. When an originally single RLC SDU is received after being divided into multiple RLC SDUs, the in-sequence delivery function of the NR RLC layer 2-10 or 2-35 may include a function of reassembling the RLC SDUs and transferring the same.

The in-sequence delivery function of the NR RLC layer 2-10 or 2-35 may include a function of reordering the received RLC PDUs based on RLC SNs or PDCP SNs. Also, the in-sequence delivery function of the NR RLC layer 2-10 or 2-35 may include a function of reordering the order and recording lost RLC PDUs. Also, the in-sequence delivery function of the NR RLC layer 2-10 or 2-35 may have a function of reporting status of the lost RLC PDUs to a transmitting side, and may include a function of requesting retransmission of the lost RLC PDUs.

When there is a lost RLC SDU, the in-sequence delivery function of the NR RLC layer 2-10 or 2-35 may include a function of transferring only RLC SDUs before the lost RLC SDU, to an upper layer in order.

Even when there is a lost RLC SDU, when a certain timer has expired, the in-sequence delivery function of the NR RLC layer 2-10 or 2-35 may include a function of transferring all RLC SDUs received before the timer is started, to an upper layer in order.

Even when there is a lost RLC SDU, when a certain timer has expired, the in-sequence delivery function of the NR RLC layer 2-10 or 2-35 may include a function of transferring all RLC SDUs received up to present, to an upper layer in order.

The NR RLC layer 2-10 or 2-35 may also sequentially process RLC PDUs regardless of an order of SNs but in order of receiving them (out-of sequence delivery) and transfer the same to the NR PDCP layer.

When the NR RLC layer 2-10 or 2-35 receives a segment, segments that are stored in a buffer or that are to be received later may be received and configured as a complete single RLC PDU and this RLC PDU may be transferred to the NR PDCP layer.

The NR RLC layer 2-10 or 2-35 may not have a concatenation function. Alternatively, a concatenation function may be performed in the NR MAC layer 2-15 or 2-30 or replaced by a multiplexing function of the NR MAC layer 2-15 or 2-30.

In the above description, the out-of-sequence delivery function of an NR RLC layer 2-10 or 2-35 may indicate a function of transferring RLC SDUs received from a lower layer directly to an upper layer regardless of an order. When an originally single RLC SDU is divided into multiple RLC SDUs and received, the out-of-sequence delivery function of the NR RLC layer 2-10 or 2-35 may include a function of reassembling the RLC SDUs and transferring the same. The out-of-sequence delivery function of the NR RLC layer 2-10 or 2-35 may include a function of storing RLC SNs or PDCP SNs of received RLC PDUs and reordering the RLC PDUs and recording lost RLC PDUs.

The NR MAC layer 2-15 or 2-30 may be connected to several NR RLC layers 2-10 or 2-35 configured in a terminal, and the major functions of the NR MAC layer 2-15 or 2-30 may include some of functions below.

Mapping between logical channels and transport channels
Multiplexing/demultiplexing of MAC SDUs
Scheduling information reporting
Hybrid ARQ (HARQ) (Error correction through HARQ)
Priority handling between logical channels of one UE
Priority handling between UEs by means of dynamic scheduling
Multimedia Broadcast Multicast Service (MBMS) service identification
Transport format selection
Padding The NR PHY layer 2-20 or 2-25 may perform channel coding or modulation on upper layer data and convert the same into an OFDM symbol and transmit the OFDM symbol to a radio channel, or demodulate an OFDM symbol received via a radio channel and perform channel decoding on the demodulated OFDM symbol and transfer the channel-decoded OFDM symbol to an upper layer.

Figure 3:
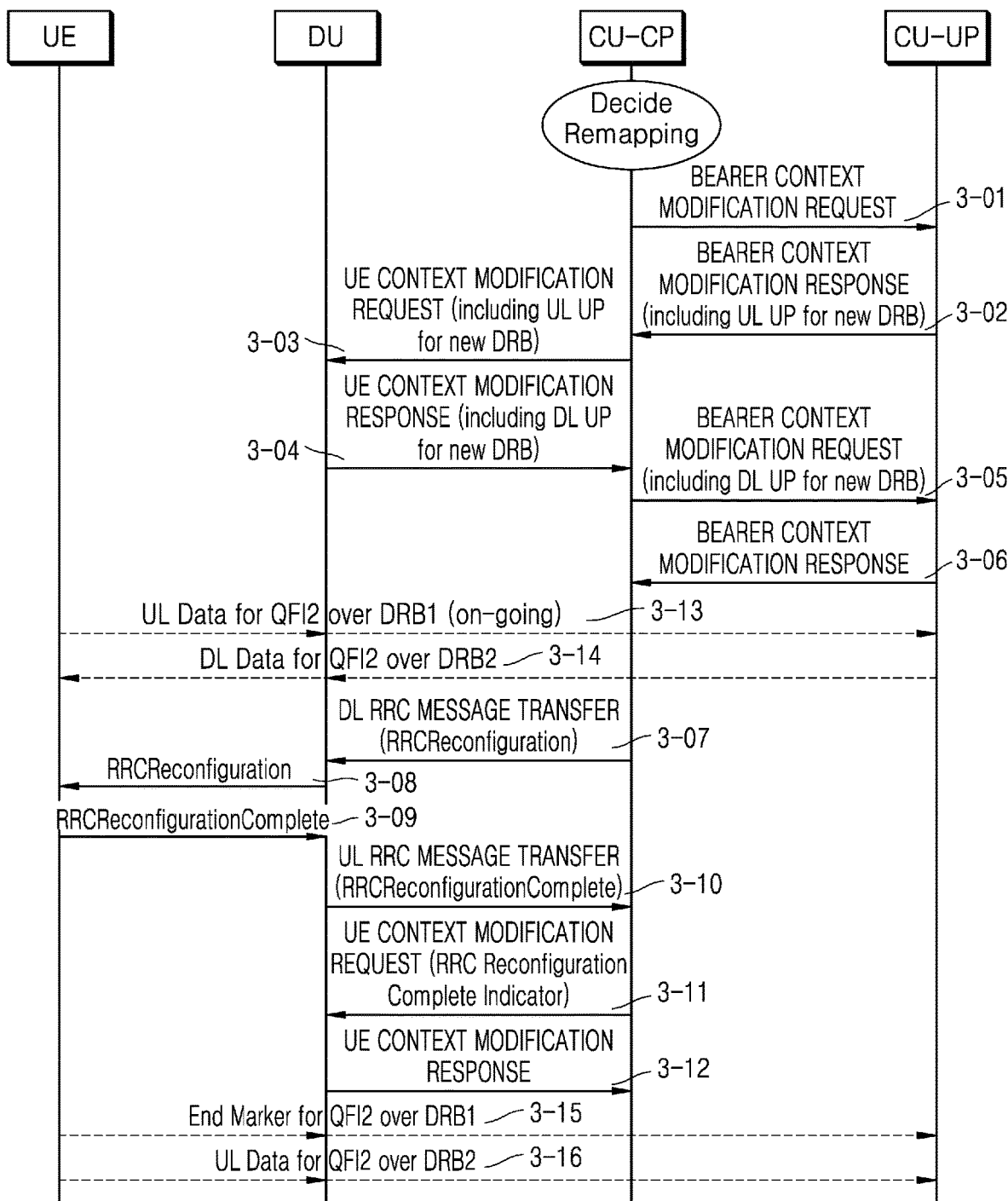
FIG. 3 is a diagram illustrating a situation where a quality of service (QoS) flow and a data radio bearer (DRB) are re-mapped according to an embodiment of the disclosure.

FIG. 3 is a diagram illustrating a situation where a QoS flow and a data radio bearer (DRB) are re-mapped according to an embodiment of the disclosure.

Referring to FIG. 3, there may be a situation where a QoS flow mapped to a DRB needs to be remapped according to necessity. According to an embodiment of the disclosure, in a situation where a base station is divided into a CU and a DU, and the CU is divided into a CU-CP and a CU-UP, the situation where a QoS flow and a DRB are remapped to each other may be conducted through operations described below.

For example, when the CU-CP determines to perform remapping, the CU-CP may transmit a BEARER CONTEXT MODIFICATION REQUEST message to the CU-UP to notify the CU-UP of new mapping information in operation 3-01. When a previous QoS flow is connected to a new DRB, generation of a new DRB is to be specified in new mapping information transmitted in operation 3-01, and DRB information thus modified according to the above specification may also be included in the new mapping information.

Also, when all previously connected QoS flows are moved to another DRB, and thus there is no DRB matching a QoS flow at all, DRBs not matching any QoS flow may be specified as a 'DRB to be removed.' The CU-UP having received a BEARER CONTEXT MODIFICATION REQUEST message may include, in a BEARER CONTEXT MODIFICATION RESPONSE message, tunnel and address information for UL communication of a newly generated or modified DRB and transmit the response message to the CU-CP, together with information indicating whether the modified mapping information is to be accepted in operation 3-02. According to an embodiment of the disclosure, information indicating whether the modified mapping information is to be accepted, tunnel and address information for UL communication of a newly generated or modified DRB, or tunnel and address information for DL communication may be referred to as remapping information.

The CU-CP that has received the BEARER CONTEXT MODIFICATION RESPONSE message may transmit or receive a UE CONTEXT MODIFICATION REQUEST/ RESPONSE message to or from the DU. That is, the CU-CP may transmit remapping information to the DU in a similar manner as operations 3-01 and 3-02 in operation 3-03. That is, the CU-CP may transmit, to the DU, a UE CONTEXT MODIFICATION REQUEST message including tunnel and address information for UL communication of a newly generated or modified DRB. The DU may transmit, to the CU-CP, tunnel and address information for DL communication via a UE CONTEXT MODIFICATION RESPONSE message in operation 3-04.

The information transmitted to the CU-CP via the UE CONTEXT MODIFICATION RESPONSE message may be included in the BEARER CONTEXT MODIFICATION REQUEST message and transmitted from the CU-CP to the CU-UP once again in operation 3-05. The CU-UP may include a response to the BEARER CONTEXT MODIFICATION REQUEST message in the BEARER CONTEXT MODIFICATION RESPONSE message and transmit the same to the CU-CP in operation 3-06. When control plane information for UL/DL communication is not modified, the above processes (i.e., operations 3-05 and 3-06) may be omitted.

After the CU-CP has transmitted or received remapping information to or from the CU-UP and the DU, the CU-CP may deliver the remapping information to a UE via an RRC message. For example, the RRC message generated by the CU-CP may be delivered to the DU in operation 3-07. The RRC message delivered to the DU may be transmitted to the UE, and the UE may normally receive the delivered RRC message in operation 3-08. The UE that has normally received the RRC message may transmit a response message to the DU in operation 3-09. An UL packet generated in the UE thereafter may be transmitted to the DU by using new mapping information. The RRC message received by the DU from the UE may be simply delivered to the CU-CP in operation 3-10. Also, after the CU-CP has read the delivered RRC message, the CU-CP may notify the DU of the completion of a RRC reconfiguration in operation 3-11. That is, the CU-CP may notify the DU of the completion of the RRC reconfiguration by transmitting a message including an RRC reconfiguration completion indicator, to the DU. Also, the DU that has received the message including the RRC reconfiguration completion indicator may transmit a response message thereto to the CU-CP in operation 3-12. After the message transmission and reception procedure (i.e., operations 3-11 and 3-12) between the DU and the CU-CP as described above, the remapping may be completed.

According to an embodiment of the disclosure, in a process of remapping of a QoS flow, an SDAP end marker packet may be used to prevent mixing of orders in which packets of a QoS flow identifier (QFI) are transmitted. For example, when a QoS flow is mapped to DRB 1 and then is newly allocated to DRB 2 through a remapping process, a packet corresponding to the QoS flow needs to be transmitted to a core network in order even when a packet that used to be transmitted via DRB 1 arrives at the core network later after a packet transmitted via DRB 2 due to a reason such as retransmission. To support the above, the UE may transmit an SDAP end marker packet immediately after a last packet transmitted via previously mapped DRB 1. The CU-UP may not transmit a packet received via the newly mapped DRB 2 to a core network but store the packet, and may start transmitting of the packet immediately after receiving an end marker packet via DRB 1. Through the above-described process, even when DRB information is modified during UL packet transmission, packets may be transmitted without mixing orders of the packets of a QFI, and the packets indicated here may be managed according to each QoS flow. That is, an SDAP end marker packet of each remapped QoS flow is to be transmitted.

The entire diagram of FIG. 3 including operations 3-13, 3-14, 3-15, and 3-15 illustrates an example in which a QoS flow corresponding to QFI 2 that was mapped to DRB 1 is remapped to newly generated DRB 2.

According to an embodiment of the disclosure, the UE may transmit UL data regarding QFI2 via DRB 1, to the CU-UP via the DU in operation 3-13.

According to an embodiment of the disclosure, the CU-UP may transmit DL data regarding QFI2 via DRB 2, to the UE via the DU in operation 3-14.

According to an embodiment of the disclosure, the UE may transmit an end marker regarding QFI 2 via DRB 1, to the CU-UP via the DU in operation 3-15.

According to an embodiment of the disclosure, the UE may transmit UL data regarding QFI 2 via DRB 2, to the CU-UP via the DU in operation 3-16.

Figure 4:
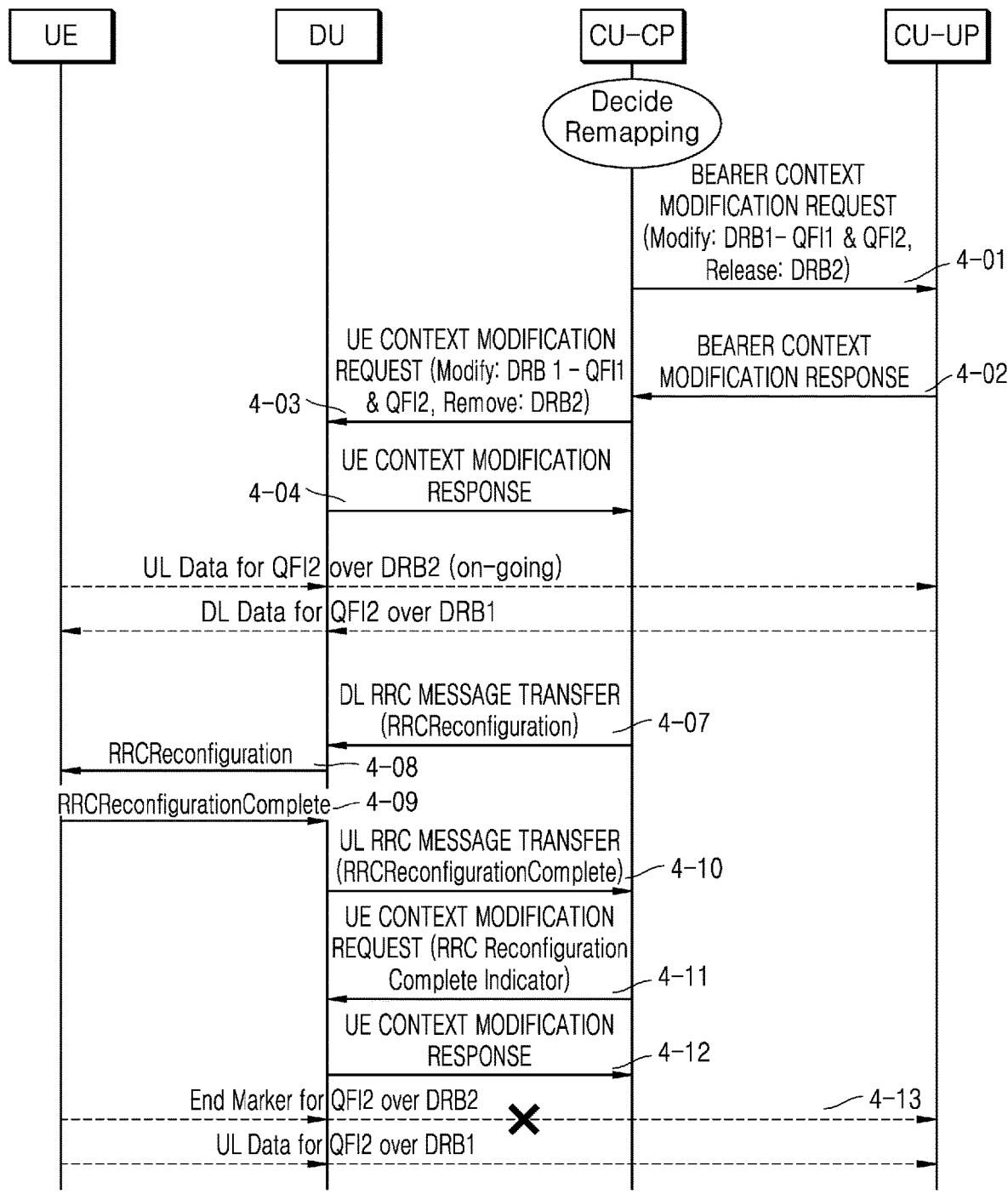
FIG. 4 is a diagram illustrating a problem that may occur in a QoS flow remapping method according to an embodiment of the disclosure.

FIG. 4 is a diagram illustrating a problem that may occur in a QoS flow remapping method according to an embodiment of the disclosure.

Referring to FIG. 4, when a QoS flow 2 (QFI2) that was solely mapped to DRB 2 is remapped to DRB 1, there may be no QoS flow mapped to DRB 2. In this case, as described with reference to FIG. 3, the CU-CP may request from each of the CU-UP and the DU removal of DRB 2 via the BEARER CONTEXT MODIFICATION REQUEST message and the UE CONTEXT MODIFICATION REQUEST message in operations 4-01 and 4-03. The CU-UP and the DU may remove the above DRB 2 and notify the CU-CP of the removal thereof via a response message in operations 4-02 and 4-04. When the CU-UP and the DU have notified the CU-CP of the removal of the DRB via the response message, the CU-CP may notify the UE of remapping information via an RRC message in operations 4-07, 4-08, 4-09, 4-10, 4-11 and 4-12. According to an embodiment of the disclosure, in order to sequentially transmit packets corresponding to a remapped QoS flow, the UE may transmit an end marker packet to the previous DRB 1. However, when the previously mapped DRB (e.g., DRB 2) disappears as described above, a path via which the UE may transmit an end marker packet may disappear in operation 4-13.

Figure 5B:
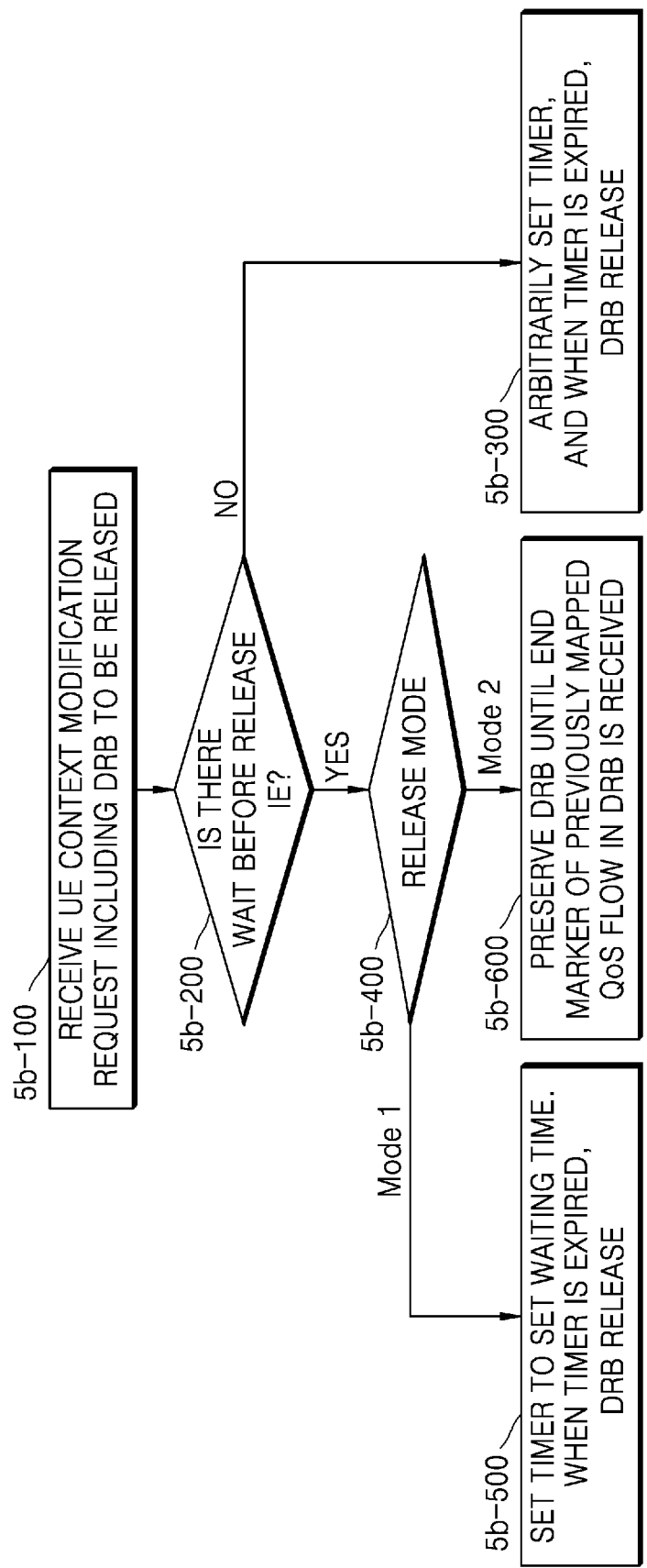
FIG. 5B illustrates an operation of a distributed unit (DU) in the first method for solving a problem that may occur in a QoS flow remapping method, according to an embodiment of the disclosure.

A first method for solving the problem described referring to FIG. 4 is suggested by referring to FIGS. 5A and 5B through FIG. 8. FIGS. 5A and 5B illustrate an operation of the CU-UP and the DU in the first method for solving the problem described referring to FIG. 4.

To solve the problem described above with reference to FIG. 4, the CU-UP (or the DU) may not immediately remove a certain DRB despite receiving, from the CU-CP, a message indicating to remove the certain DRB, but may have to preserve the DRB for a certain period of time. This is because the CU-UP (or the DU) has to receive an end marker via that DRB. According to an embodiment of the disclosure, an end marker and an end marker packet may be used interchangeably. After receiving an end marker packet, the CU-UP (or the DU) needs to remove the DRB according to the initial indication. For the above operation, there may be a method of arbitrarily preserving, by the CU-UP and the DU, the DRB for a certain period of time without adding an additional information element (IE), and a method of specifying a period during which the DRB is to be preserved by adding an IE within a CONTEXT MODIFICATION message.

Referring to FIGS. 5A and 5B, when there is information indicating to remove the DRB in a BEARER (or a UE) CONTEXT MODIFICATION REQUEST message received by the CU-UP (or the DU) from the CU-CP in operations 5*a*-100 and 5*b*-100, the CU-UP (or the DU) may first determine whether a Wait Before Removal (or a Release) IE is included in the REQUEST message in operations 5*a*-200 and 5*b*-200. When a Wait Before Removal (or a Release) IE is not present in the REQUEST message, the CU-UP (or the DU) may remove the DRB after setting a timer to a set period of time set by itself and remove the DRB when the timer has expired on operations 5*a*-300 and 5*b*-300.

When there is a Wait Before Removal (or a Release) IE, an operation of the CU-UP (or the DU) may be as below according to modes in operations 5*a*-400 and 5*b*-400.

Mode 1 (i.e., operations 5*a*-500 and 5*b*-500): A timer is set to a defined waiting time, and the DRB is removed when the timer has expired. When waiting time is set to 0, the DRB is immediately removed.

Mode 2 (i.e., operations 5*a*-600 and 5*b*-600): the DRB is removed after all end marker packets of a QoS flow previously mapped to the DRB have arrived.

FIGS. 5A and 5B will be further described below.

FIG. 5A illustrates an operation of a CU-UP in the first method for solving a problem that may occur in a QoS flow remapping method, according to an embodiment of the disclosure.

Referring to FIG. 5A, the CU-UP may receive a BEARER CONTEXT MODIFICATION REQUEST message including DRB to Remove information, from the CU-CP in operation 5*a*-100. The DRB to Remove may include information related to removal of a certain DRB.

The CU-UP may identify whether a Wait Before Removal IE is present in the received BEARER CONTEXT MODIFICATION REQUEST message in operation 5*a*-200. According to an embodiment of the disclosure, when there is no Wait Before Removal IE in the BEARER CONTEXT MODIFICATION REQUEST message, the CU-UP may arbitrarily set a timer and perform DRB removal (DRB remove) when the timer is expired in operation 5*a*-300. According to an embodiment of the disclosure, when there is a Wait Before Removal IE in the BEARER CONTEXT MODIFICATION REQUEST message, the CU-UP may execute a Removal mode (5*a*-400).

In Mode 1, the CU-UP may set a timer to a set waiting time, and when the set timer has expired, the CU-UP may perform DRB removal (DRB remove) in operation 5*a*-500.

In Mode 2, the CU-UP may not remove the DRB but preserve the same until an end marker of a previously mapped QoS flow in the DRB is received. After receiving the end marker, the CU-UP may remove the DRB (DRB remove) in operation 5*a*-600.

FIG. 5B illustrates an operation of a DU in the first method for solving a problem that may occur in a QoS flow remapping method, according to an embodiment of the disclosure.

Referring to FIG. 5B, the DU may receive a UE CONTEXT MODIFICATION REQUEST message including DRB to be released information, from the CU-CP in operation 5b-100. The DRB to be released may include information related to removal of a certain DRB.

The DU may identify whether a Wait Before Release IE is present in the received UE CONTEXT MODIFICATION REQUEST message in operation 5b-200. According to an embodiment of the disclosure, when there is no Wait Before Release IE in the UE CONTEXT MODIFICATION REQUEST message, the DU may arbitrarily set a timer and perform DRB removal (DRB release) when the timer is expired in operation 5b-300. According to an embodiment of the disclosure, when there is a Wait Before Release IE in the UE CONTEXT MODIFICATION REQUEST message, the DU may execute a Release mode in operation 5b-400.

In Mode 1, the DU may set a timer to a set waiting time, and when the set timer has expired, the CU-UP may perform DRB removal (DRB release) in operation 5b-500.

In Mode 2, the DU may not remove the DRB but preserve the same until an end marker of a previously mapped QoS flow in the DRB is received. After receiving the end marker, the CU-UP (or the DU) may remove the DRB (DRB release) in operation 5b-600.

FIG. 6 illustrates a message that is newly defined to define an operation according to the first method, according to an embodiment of the disclosure. That is, FIG. 6 illustrates a message newly defined to define the operations of FIGS. 5A and 5B.

Referring to FIG. 6, a Wait Before Removal (Release) IE may be added to each of the BEARER CONTEXT MODIFICATION REQUEST message and the UE CONTEXT MODIFICATION REQUEST message, and Mode 1 and 2 values may be added (6-100, 6-200). That is, as shown in (a) of FIG. 6, a Wait Before Removal IE may be included in the BEARER CONTEXT MODIFICATION REQUEST message. Also, as shown in (b) of FIG. 6, a Wait Before Release IE may be included in the UE CONTEXT MODIFICATION REQUEST message.

Figure 7:
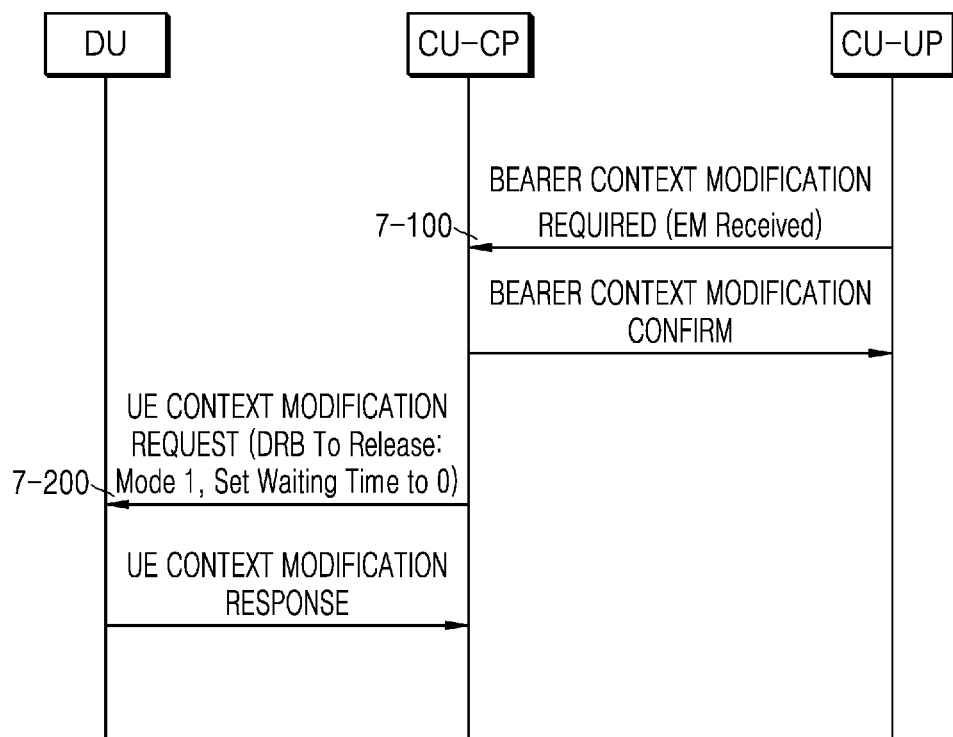
FIG. 7 illustrates a method of notifying, by a CU-UP, a CU-control plane (CP) about whether an end marker is received, according to an embodiment of the disclosure.

FIG. 7 is a diagram illustrating a method of notifying, by the CU-UP, the CU-CP of whether an end marker is received, and an IE newly defined therefor, and FIG. 8 illustrates an IE that is newly defined for the above method.

FIG. 7 illustrates a procedure required to support Mode 2 in the operations of FIGS. 5A and 5B. Also, as the DU is not able to determine whether an end marker is received, the CU-CP that is notified by the CU-UP needs to notify the DU of whether an end marker is received. Thus, for the above-described operation, the procedure and the IE respectively described with reference to FIGS. 7 and 8 may be necessary.

FIG. 7 illustrates a method of notifying, by a CU-UP, a CU-CP of whether an end marker is received, according to an embodiment of the disclosure.

FIG. 8 illustrates a newly defined IE to notify, by the CU-UP, the CU-CP of whether an end marker is received, according to an embodiment of the disclosure.

Referring to FIGS. 7 and 8, a BEARER CONTEXT MODIFICATION REQUIRED message may refer to a message transmitted by the CU-UP when requesting, from the CU-CP, modification of bearer context information. The CU-UP may notify the CU-CP that an end marker corresponding to a QoS flow is received by defining a new IE of 'End Marker Received Flow' in DRB To Modify List in the BEARER CONTEXT MODIFICATION REQUIRED message in operation 7-100. For example, FIG. 8 illustrates IEs referred to as 'End Marker Received' and 'QoS Flow ID' 8-100.

The above process (e.g., operation 7-100) may be triggered each time when the CU-UP receives an end marker packet. Thus, immediately when the CU-UP receives an end marker packet, the CU-CP may simultaneously recognize the reception of the packet. When the CU-CP that is tracking whether the CU-UP receives an end marker receives an end marker packet that is previously mapped to a DRB and recognizes that there is no need to preserve the DRB any more, the CU-CP may transmit a UE CONTEXT MODIFICATION REQUEST message to the DU in operation 7-200 to indicate to remove the DRB that the DU is preserving. The DU may immediately remove the DRB by setting a mode (Release Mode) described with reference to FIG. 5B to 1 and setting waiting time to 0.

Figure 9:
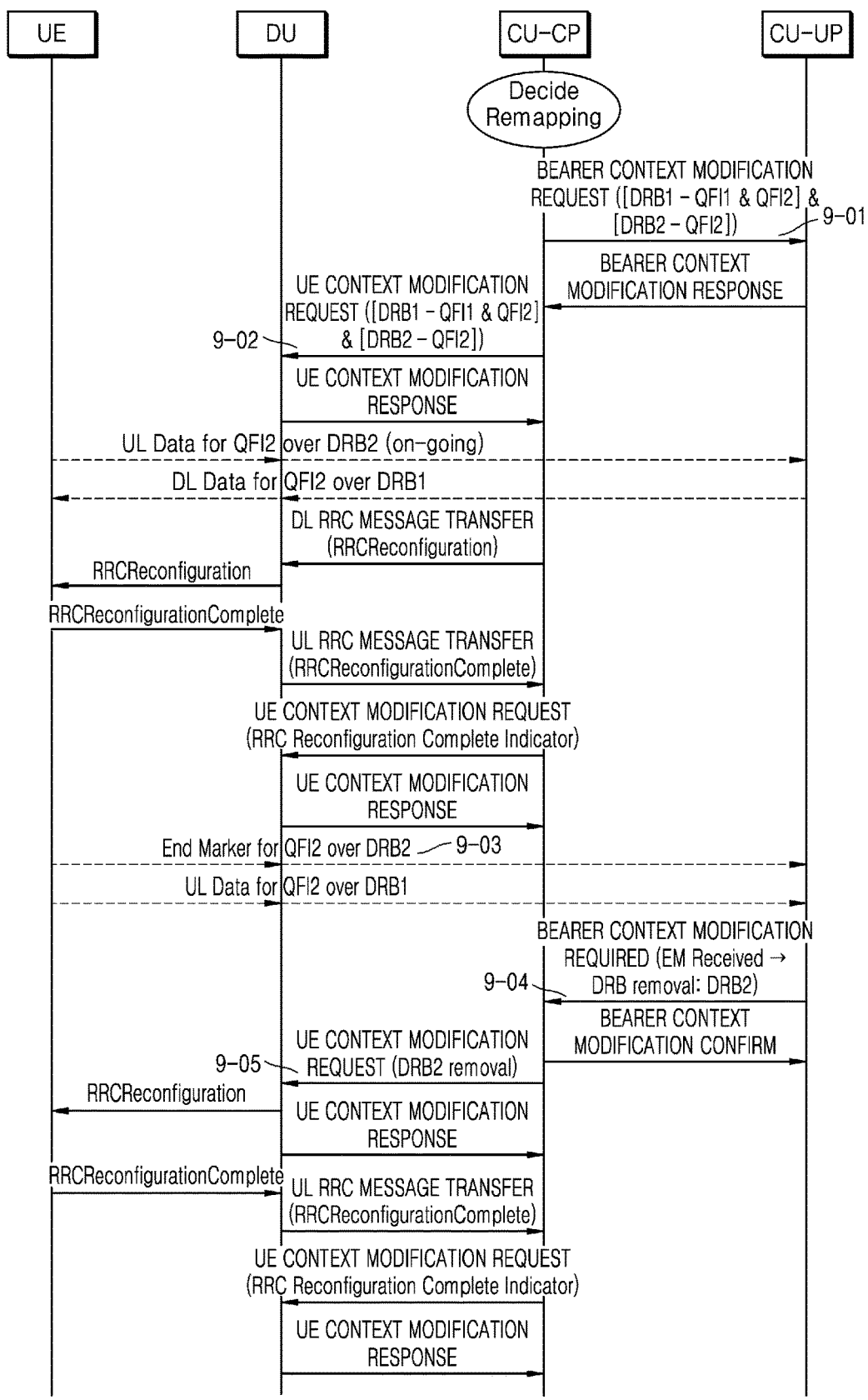
FIG. 9 illustrates a second method for solving a problem that may occur in a QoS flow remapping method, according to an embodiment of the disclosure.

FIG. 9 illustrates a second method for solving a problem that may occur in a QoS flow remapping method, according to an embodiment of the disclosure. That is, FIG. 9 illustrates the second method for solving the problem described with reference to FIG. 4.

Referring to FIG. 9, 'DRB to be removed' is not used in a BEARER (or a UE) CONTEXT MODIFICATION REQUEST message. In the embodiment illustrated in FIG. 9, when a DRB is to be removed, a QoS flow to be remapped to both a previous DRB and a DRB to be newly connected is mapped, thereby allowing the CU-UP and the DU to recognize both DRBs as a DRB to be removed. For example, when QFI 1 that was in DRB 2 is remapped to DRB 1 and DRB 2 is to be removed, mapping information in a CONTEXT MODIFICATION REQUEST message may be configured as [DRB 1-QFI1 & QFI2, DRB 2-QFI1] in operations 9-01 and 9-02. When a QoS flow is mapped to two DRBs in a BEARER (or a UE) CONTEXT MODIFICATION REQUEST message received by the CU-UP (or the DU) from the CU-CP, the QoS flow may be connected to a DRB to which more types of QoS flows are mapped, from among the two DRBs, and the other DRB may be regarded as a DRB to disappear after receiving an end marker packet. After the CU-UP has received an end marker packet of all QoS flows previously mapped to the DRB to be removed in operation 9-03, the DRB may be removed. The operation of removing the DRB as above is as described with reference to FIGS. 7 and 8 in operations 9-04 and 9-05).

Figure 10:
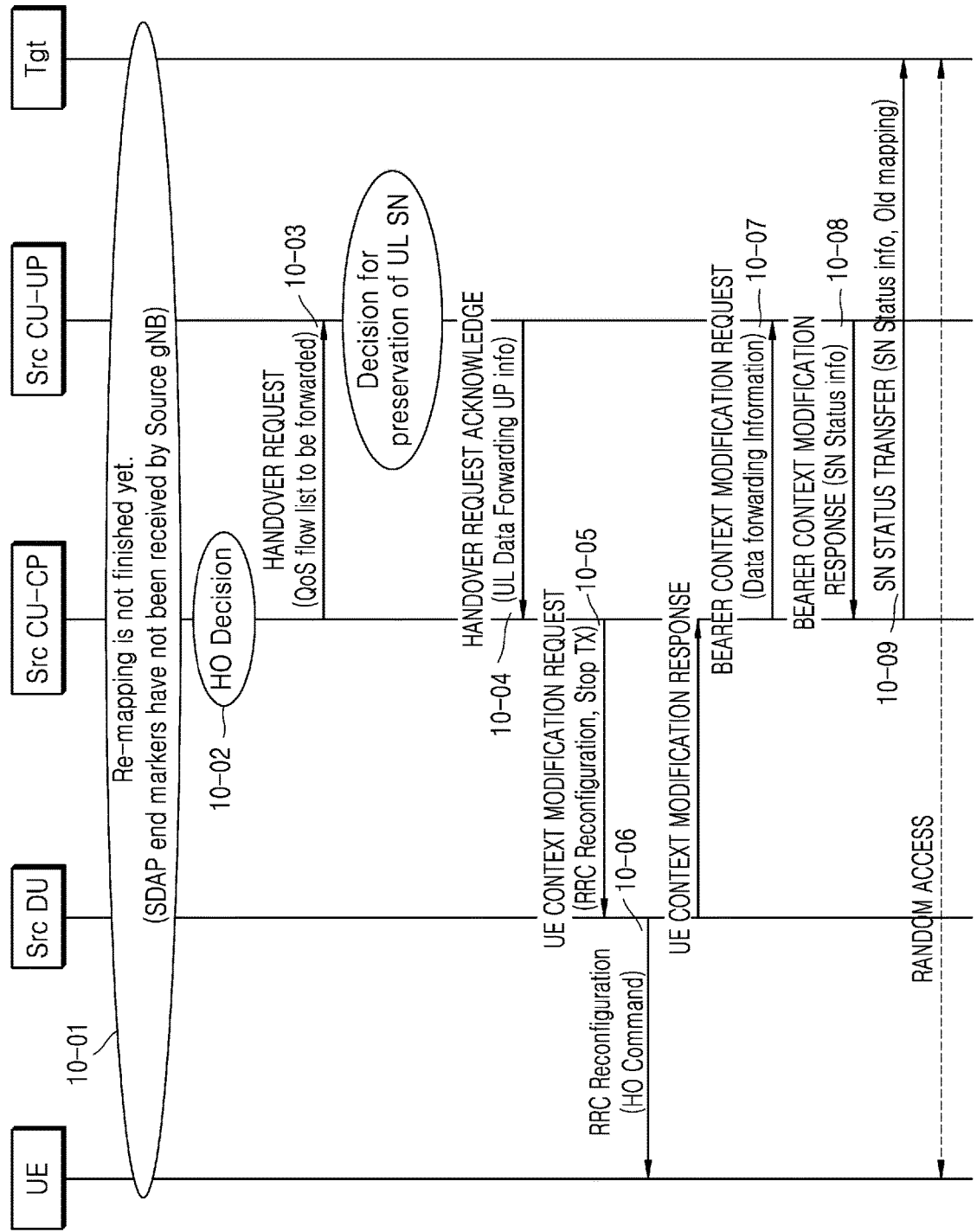
FIG. 10 illustrates a handover taking place during remapping of a QoS flow, and a problem occurring in the above process according to an embodiment of the disclosure.

FIG. 10 illustrates a handover taking place during remapping of a QoS flow, and a problem in the above process according to an embodiment of the disclosure.

Referring to FIG. 10, after a QoS flow remapping message is transmitted, when a handover occurs while an SDAP end marker packet corresponding to some or all of QoS flows is not received, there is a need to notify a target CU-CP of this handover to support and enable lossless transmission.

In the above-described situation, that is, while remapping is not completed in operation 10-01, when a source CU-CP determines a handover in operation 10-02, a HANDOVER REQUEST message may be transmitted to the target CU-CP in operation 10-03. When there is a QoS flow, of which remapping is not completed, the source CU-CP may suggest the target CU-CP UL data forwarding with respect to the above QoS flow in operation 10-03. As a response to the suggestion of forwarding, the target CU-CP may include a QoS flow to accept UL data forwarding and address information or the like needed for data forwarding, in a HANDOVER REQUEST ACKNOWLEDGE message and transmit the message to the source CU-CP in operation 10-04.

With respect to a QoS flow for which UL data forwarding is agreed, even when a handover takes place, lossless transmission may be performed. The source CU-CP that has received the HANDOVER REQUEST ACKNOWLEDGE message may transmit a UE CONTEXT MODIFICATION REQUEST message to the DU to thereby indicate the DU to stop UL data transmission in operation 10-05. Also, the DU may transmit an RRC message to the UE to notify the UE of the handover in operation 10-06. At the same time as the above, the source CU-UP may obtain a PDCP sequence number (SN) of the source CU-UP for UL data forwarding support through a BEARER CONTEXT MODIFICATION procedure in operations 10-07 and 10-08. While the source CU-UP is described as transmitting an RRC message to the UE via the DU and performing a BEARER CONTEXT MODIFICATION procedure at the same time, a procedure in which the source CU-UP transmits an RRC message to the UE via the DU and the BEARER CONTEXT MODIFICATION procedure may also be sequentially performed. For example, the BEARER CONTEXT MODIFICATION procedure is as follows. The source CU-CP may transmit a BEARER CONTEXT MODIFICATION REQUEST message including data forwarding information to the source CU-UP (10-07). The source CU-UP may transmit a BEARER CONTEXT MODIFICATION RESPONSE message including SN status information to the source CU-CP in operation 10-08.

The source CU-CP may generate an SN STATUS TRANSFER message based on the obtained UL SN and transmit the message to the target CU-CP in operation 10-09. According to an embodiment of the disclosure, the SN STATUS TRANSFER message may include a list of QoS flows, of which an SDAP end marker packet is not received yet, together with SN information of each DRB. The target CU-CP that has received the SN STATUS TRANSFER message may expect arrival of an end marker packet of a QoS flow in the list, and thus, the target CU-CP may preserve a DRB while preventing mixing of orders of data packets of the QoS flow as described with respect to the remapping process.

FIG. 10 illustrates a method reconfigured by considering messages to be transmitted or received among a CU-CP, a CU-UP, and a DU for separation into the CU-CP, the CU-UP, and the DU in a handover operation in an environment in which a gNB not separated into a CU and a DU is installed. In the method of FIG. 10, not all operations supported by a handover considering only a single gNB may be followed. The above problem is described below.

An entity that generates a HANDOVER REQUEST message and an SN STATUS TRANSFER message is the CU-CP, and as described above, important information included in the two messages may be notified when a source CU-CP receives an SDAP end marker packet of each QoS flow to discover whether remapping is completed. As there is no way for the CU-CP to know whether the CU-UP has received an end marker by using the existing method, first, the CU-CP may not be able to determine whether to suggest UL forwarding with respect to which QoS flow when generating a HANDOVER REQUEST message in operation 10-03. That is, the first problem may be that CU-CP may not be able to select a QoS flow to suggest UL data forwarding for.

Secondly, it may be impossible for the CU-CP to identify information regarding a QoS flow, of which an end marker is not received, and thus to include the information about the QoS in an SN STATUS TRANSFER message and transmit the message to a target in operation 10-09. In the disclosure, a target may indicate a target base station, a target CU-PU, or a target CU-UP.

In order to solve the problems that may occur in the example of FIG. 10 described above, the embodiment described with reference to FIGS. 7 and 8 may be presented as a first method.

As suggested in FIGS. 7 and 8, when the CU-UP informs the CU-CP every time the CU-UP receives an end marker packet in operation 7-100 and 8-100), the source CU-CP may identify, at any point in time, a QoS flow, of which an end marker packet is received. The source CU-CP then may create a HANDOVER REQUEST message and an SN STATUS TRANSFER message based on the information as to whether an end marker packet is received.

FIG. 11 illustrates a second method for solving the problems that may occur in the example of FIG. 10 according to an embodiment of the disclosure. That is, FIG. 11 illustrates the second method for solving a problem that may occur when a handover takes place during remapping of a QoS flow, according to an embodiment of the disclosure.

Referring to FIG. 11, unlike the embodiment of FIGS. 7 and 8, in which whether an end marker packet is received or not is signaled by adding an additional IE and a procedure, a method of adding an IE to a BEARER CONTEXT MODIFICATION RESPONSE message as in FIG. 11 may be suggested as the second method for solving the problems that may occur in the example of FIG. 10.

First, the first problem that a QoS flow to suggest UL data forwarding for cannot be selected may be addressed by suggesting, by the source CU-CP, UL data forwarding with respect to all QoS flows that are recently remapped, in a HANDOVER REQUEST message. This is because the CU-CP is not able to know those QoS flows, of which an end marker packet has arrived at the CU-UP as described above. Also, the method for solving the first problem described above may be possible as a response indicating that UL forwarding is not necessary is transmitted by the target with respect to a QoS flow, for which remapping is completed by receiving an end marker already.

According to an embodiment of the disclosure, a QoS flow list that is to accept UL data forwarding with respect to the QoS flow list, suggested by the CU-CP may also be transmitted from the target to the source CU-CP via a HANDOVER REQUEST ACKNOWLEDGE message. The CU-CP may request, from the CU-UP, based on the above QoS flow list, related PDCP SN information via a PDCP SN Status Request IE in a BEARER CONTEXT MODIFICATION REQUEST message to support UL data forwarding with respect to the QoS flow list.

According to an embodiment of the disclosure, when transmitting PDCP SN Status information as a response to the request for the PDCP SN information described above, the source CU-UP may include information about QoS flows, of which an end marker is not received, in Old QoS Flow List-UL End Marker expected 11-100 that is newly defined and transmit the same. As a result, the source CU-CP may identify a list of QoS flows, of which an end marker packet is not received, immediately before generating an SN STATUS TRANSFER message. The source CU-CP may generate a correct SN STATUS TRANSFER message based on the above information regarding the list and transmit the message.

Figure 12:
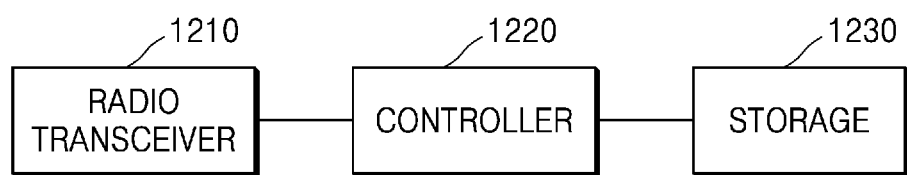
FIG. 12 is a structural diagram of a terminal according to an embodiment of the disclosure.

FIG. 12 is a structural diagram of a terminal according to an embodiment of the disclosure.

Referring to FIG. 12, the terminal may include a radio transceiver 1210, a controller 1220, and a storage 1230. A controller in the disclosure may be defined as a circuit or an application specific integrated circuit or at least one processor. However, elements of the terminal are not limited to the above example. For example, the terminal may include more elements than the above-described elements or fewer elements than the above-described elements. Moreover, the controller 1220, the radio transceiver 1210, and the storage 1230 may be implemented as a single chip.

According to an embodiment of the disclosure, the radio transceiver 1210 may transmit or receive a signal to or from another network entity. The radio transceiver 1210 may receive a signal, for example, from a base station, and transmit a signal including a message such as a measurement report to the base station. Also, the radio transceiver 1210 may transmit or receive a signal to or from a base station. A signal transmitted to or received from a base station may include control information and data. The radio transceiver 1210 may include an RF transmitter up-converting and amplifying a frequency of a transmitted signal and a radio frequency (RF) receiver performing low noise amplification on a received signal and down-converting a frequency of the received signal. However, this is merely an embodiment of the radio transceiver 1210, and the elements of the radio transceiver 1210 are not limited to the RF transmitter and the RF receiver. In addition, the radio transceiver 1210 may receive a signal via a radio channel and output the signal to the controller 1220, and transmit the signal output from the controller 1220, via the radio channel According to an embodiment of the disclosure, the radio transceiver 1210 may be referred to as a transceiver.

The controller 1220 may control overall operations of the terminal according to an embodiment suggested in the disclosure. For example, the controller 1220 may control a signal flow between blocks to perform an operation according to the flowcharts described above. For example, the controller 1220 may control elements of the terminal to perform QoS flow remapping according to an embodiment of the disclosure. The controller 1220 may be provided in a plurality of controllers, and the controller 1220 may perform a QoS flow remapping operation according to the disclosure described above by executing a program stored in the storage 1230. According to an embodiment of the disclosure, the controller 1220 may be referred to as a processor, at least one processor, or the like. Also, the controller 1220 may transmit a measurement report according to an embodiment of the disclosure to a source RAN node, and control an operation suggested by the disclosure to determine whether to perform a handover according to configured handover triggering conditions based on an RRC Reconfiguration message received from the source RAN node.

The storage 1230 may store at least one of information transmitted or received via the transceiver 1210 or information generated using the controller 1220. The storage 1230 may store programs and data required for an operation of the terminal. Also, the storage 1230 may store control information or data included in a signal transmitted or received by the terminal. The storage 1230 may be configured with a storage medium, such as read-only memory (ROM), random access memory (RAM), a hard disk, compact disc-ROM (CD-ROM), or digital versatile disc (DVD), or a combination thereof. Also, the storage 1230 may be configured in a plurality of storages. According to an embodiment of the disclosure, the storage 1230 may store a program for performing a QoS flow remapping operation which is an embodiment of the disclosure. For example, the storage 1230 may store information related to a measurement report and information related to a handover or the like.

Figure 13:
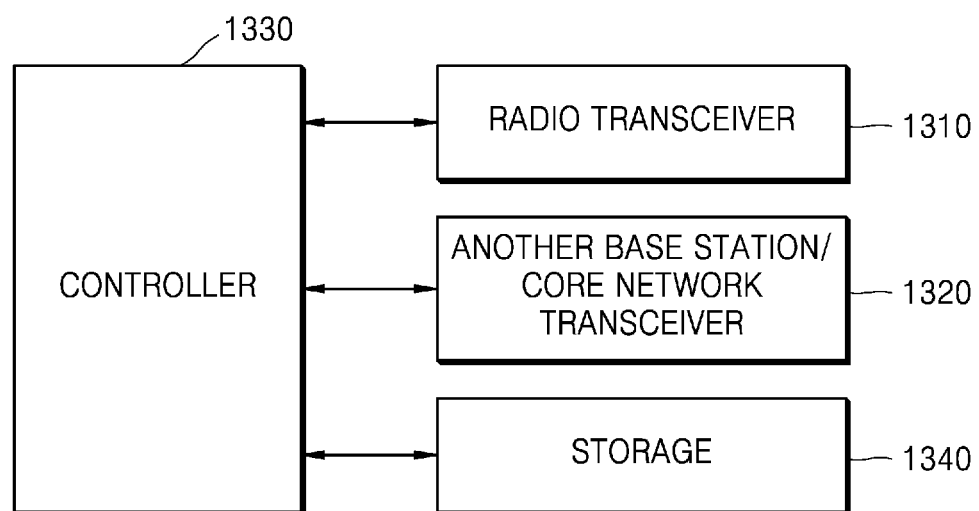
FIG. 13 is a structural diagram of a base station according to an embodiment of the disclosure.

FIG. 13 is a structural diagram of a base station according to an embodiment of the disclosure.

Referring to FIG. 13, the base station may include a radio transceiver 1310, another base station/core network transceiver 1320, a controller 1330, and a storage 1340. A controller in the disclosure may be defined as a circuit or an application specific integrated circuit or at least one processor. However, the elements of the base station are not limited to the above example. For example, the base station may include more elements than the above-described elements or fewer elements than the above-described elements. Moreover, the radio transceiver 1310, the other base station/core network transceiver 1320, the controller 1330, and the storage 1340 may be implemented in a single chip form. The base station illustrated in FIG. 13 may indicate a source RAN node or a target RAN node.

According to an embodiment of the disclosure, the radio transceiver 1310 may transmit or receive a signal to or from another network entity. For example, the radio transceiver 1310 may receive a signal from a terminal or transmit a signal including a message such as an RRE Reconfiguration that controls an operation of the terminal. Also, the radio transceiver 1310 may transmit or receive a signal to or from the terminal. A signal transmitted to or received from the terminal may include control information and data. The radio transceiver 1310 may include, for example, an RF transmitter up-converting and amplifying a frequency of a transmitted signal and an RF receiver performing low noise amplification on a received signal and down-converting a frequency of the received signal. However, this is merely an embodiment of the radio transceiver 1310, and the elements of the radio transceiver 1310 are not limited to the RF transmitter and the RF receiver. In addition, the radio transceiver 1310 may receive a signal via a radio channel and output the same to the controller 1330, and transmit the signal output from the controller 1330, via the radio channel.

According to an embodiment of the disclosure, the other base station/core network transceiver 1320 may transmit or receive a signal to or from another network entity. For example, a source RAN node and a target RAN node may transmit or receive signals including a message such as a HANDOVER REQUEST for requesting a handover and HANDOVER REQUEST ACKNOWLEDGE for responding to the request for a handover, and the source RAN node and the target RAN node may transmit and receive user data for data forwarding.

According to an embodiment of the disclosure, the controller 1330 may control overall operations of the base station according to an embodiment suggested in the disclosure. For example, the controller 1330 may control a signal flow between blocks to perform an operation according to the flowcharts described above. For example, the controller 1330 may control elements of a base station to perform QoS flow remapping according to an embodiment of the disclosure, and the controller 1330 may be provided in a plurality of controllers, and the controller 1330 may perform a QoS flow remapping operation of the disclosure described above by executing a program stored in the storage 1340. According to an embodiment of the disclosure, the controller 1330 may be referred to as a processor, at least one processor, or the like. Also, when a conditional handover is configured with respect to multiple target cells from a source RAN node to a target RAN node according to an embodiment of the disclosure, the controller 1330 may control an operation suggested according to the disclosure to efficiently perform early data forwarding in the target RAN node.

According to an embodiment of the disclosure, the storage 1340 may store at least one of information transmitted or received via the radio transceiver 1310 and the other base station/core network transceiver 1320 or information generated using the controller 1330.

The storage 1340 may store programs and data required for an operation of the base station. Also, the storage 1340 may store control information or data included in a signal transmitted or received by the base station. The storage 1340 may be configured with a storage medium, such as ROM, RAM, a hard disk, CD-ROM, or DVD, or a combination thereof. Also, the storage 1340 may be configured in a plurality of storages. According to an embodiment of the disclosure, the storage 1340 may store a program for performing a QoS flow remapping operation which is an embodiment of the disclosure. For example, the storage 1340 may store information for a conditional handover or information for efficiently performing early data forwarding.

The methods according to the embodiments described in the claims or specification of the disclosure may be implemented in the form of hardware, software, or a combination of hardware and software.

When implemented as software, a computer-readable storage medium or a computer program product storing one or more programs (e.g., software modules) may be provided. The one or more programs stored in the computer-readable storage medium or the computer program product are configured for execution by one or more processors in an electronic device. The one or more programs include instructions causing the electronic device to execute the methods according to embodiments as described in the claims or the specification of the disclosure.

The programs (e.g., software modules or software) may be stored in RAM, a non-volatile memory including a flash memory, ROM, an electrically erasable programmable read-only memory (EEPROM), a magnetic disc storage device, CD-ROM, DVD, or other types of optical storage device, or a magnetic cassette. Alternatively, the programs may be stored in a memory including a combination of some or all of the above-mentioned memories. In addition, each constituent memory may be included by a plural number.

The programs may also be stored in an attachable storage device which is accessible through a communication network configured with the Internet, an intranet, a local area network (LAN), a wide LAN (WLAN), or a storage area network (SAN), or a combination thereof. The storage device may be connected to an apparatus performing the embodiments of the disclosure through an external port. Another storage device on a communication network may also be connected to the apparatus performing the embodiments of the disclosure.

In the disclosure, the term "computer program product" or "computer-readable medium" is used to refer to a medium such as a memory, a hard disk installed in a hard disk drive, a signal, or the like, as a whole. The "computer program product" or "computer-readable medium" are means provided to a method of performing QoS flow remapping according to the disclosure.

According to the embodiment of the disclosure, an apparatus and method for effectively providing services in a mobile communication system are provided.

While the disclosure has been shown and described with reference to various embodiments thereof, it will be understood by those skilled in the art that various changes in form and details may be made therein without departing from the spirit and scope of the disclosure as described by the appended claims and their equivalents.

Meanwhile, the embodiments of the disclosure disclosed in the specification and the drawings are merely examples to provide an easy description of the technical content of the disclosure and help understanding of the disclosure, and are not intended to limit the scope of the disclosure. In other words, it is obvious to those skilled in the art that other modifications based on the technical spirit of the disclosure can be implemented. Also, the embodiments of the disclosure may be combined with each other as required. For example, a base station and a terminal may be operated by combining parts of an embodiment of the disclosure with parts of another embodiment of the disclosure. Also, the embodiments of the disclosure are applicable to other communication systems, and other modification examples based on the technical idea of the embodiments of the disclosure may also be made. For example, the embodiments of the disclosure may be applied to a LTE, 5G or NR system.

What is claimed is:

1. A method performed by a centralized unit (CU)-user plane (UP) of a base station in a wireless communication system, the method comprising:
   receiving, from a CU-control plane (CP) of the base station, a bearer context modification request message, wherein the bearer context modification request message comprises information associated with a request for a packet data convergence protocol (PDCP) sequence number (SN) status; and
   transmitting, based on the bearer context modification request message, a bearer context modification response message to the CU-CP of the base station, wherein the bearer context modification response message comprises information associated with the PDCP SN status and information indicating at least one quality of service (QoS) flow, of which a service data adaptation protocol (SDAP) end marker is not received by the CU-UP of the base station.

2. The method of claim 1, wherein the information associated with the request for the PDCP SN status comprises information used by the CU-CP of the base station to request provision of the PDCP SN status from the CU-UP of the base station.

3. The method of claim 1, wherein the information indicating the at least one QoS flow, of which the SDAP end marker is not received comprises information indicating the at least one QoS flow, of which the SDAP end marker is not received by the CU-UP of the base station, in case that remapping of a QoS flow to a data radio bearer (DRB) is performed by the CU-CP of the base station.

4. The method of claim 1, wherein the information indicating the at least one QoS flow, of which the SDAP end marker is not received is included in the bearer context modification response message in response to a handover being performed when the CU-CP of the base station performs remapping of a QoS flow to a data radio bearer (DRB).

5. The method of claim 1, further comprising:
   transmitting a bearer context modification required message to the CU-CP of the base station, wherein the bearer context modification required message comprises an identifier of a QoS flow, of which the SDAP end marker is received by the CU-UP of the CU of the base station; and
   receiving, from the CU-CP of the base station, based on the bearer context modification required message, a bearer context modification confirm message.

6. A centralized unit (CU)-user plane (UP) of a base station in a wireless communication system, the CU-UP comprising:
   a transceiver; and
   at least one processor coupled with the transceiver and configured to:
      receive, from a CU-control plane (CP) of the base station, a bearer context modification request message,
      wherein the bearer context modification request message comprises information associated with a request for a packet data convergence protocol (PDCP) sequence number (SN) status, and
      transmit, based on the bearer context modification request message, a bearer context modification response message to the CU-CP of the base station,
   wherein the bearer context modification response message comprises information associated with the PDCP SN status and information indicating at least one quality of service (QoS) flow, of which a service data adaptation protocol (SDAP) end marker is not received by the CU-UP of the base station.

7. The CU-UP of claim 6, wherein the information associated with the request for the PDCP SN status comprises information used by the CU-CP of the base station to request provision of the PDCP SN status from the CU-UP of the base station.

8. The CU-UP of claim 6, wherein the information indicating the at least one QoS flow, of which the SDAP end marker is not received comprises information indicating the at least one QoS flow, of which the SDAP end marker is not received by the CU-UP of the base station, in case that remapping of a QoS flow to a data radio bearer (DRB) is performed by the CU-CP of the base station.

9. The CU-UP of claim 6, wherein the information indicating the at least one QoS flow, of which the SDAP end marker is not received is included in the bearer context modification response message in response to a handover being performed when the CU-CP of the base station performs remapping of a QoS flow to a data radio bearer (DRB).

10. The CU-UP of claim 6, wherein the at least one processor is further configured to:
   transmit a bearer context modification required message to the CU-CP of the base station, wherein the bearer context modification required message comprises an identifier of a QoS flow, of which the SDAP end marker is received by the CU-UP of the CU of the base station, and
   receive, from the CU-CP of the base station, based on the bearer context modification required message, a bearer context modification confirm message.

11. A method performed by a centralized unit (CU)-control plane (CP) of a base station in a wireless communication system, the method comprising:
   transmitting a bearer context modification request message to a CU-user plane (UP) of the base station,
   wherein the bearer context modification request message comprises information associated with a request for a packet data convergence protocol (PDCP) sequence number (SN) status; and
   receiving, based on the bearer context modification request message, a bearer context modification response message from the CU-UP of the base station,
   wherein the bearer context modification response message comprises information associated with the PDCP SN status and information indicating at least one quality of service (QoS) flow, of which a service data adaptation protocol (SDAP) end marker is not received by the CU-UP of the base station.

12. The method of claim 11, wherein the information associated with the request for the PDCP SN status comprises information used by the CU-CP of the base station to request provision of the PDCP SN status from the CU-UP of the base station.

13. The method of claim 11, wherein the information indicating the at least one QoS flow, of which the SDAP end marker is not received comprises information indicating the at least one QoS flow, of which the SDAP end marker is not received by the CU-UP of the base station, in case that remapping of a QoS flow to a data radio bearer (DRB) is performed by the CU-CP of the base station.

14. The method of claim 11, wherein the information indicating the at least one QoS flow, of which the SDAP end marker is not received is included in the bearer context modification response message in response to a handover being performed when the CU-CP of the base station performs remapping of a QoS flow to a data radio bearer (DRB).

15. The method of claim 11 further comprising:
   receiving a bearer context modification required message from the CU-UP of the base station, wherein the bearer context modification required message comprises an identifier of a QoS flow, of which the SDAP end marker is received by the CU-UP of the base station; and
   transmitting, based on the bearer context modification required message, a bearer context modification confirm message to the CU-UP of the base station.

16. A centralized unit (CU)-control plane (CP) of a base station in a wireless communication system, the CU-CP comprising:
   a transceiver; and
   at least one processor coupled with the transceiver and configured to:
      transmit a bearer context modification request message to a CU-user plane (UP),
      wherein the bearer context modification request message comprises information associated with a request for a packet data convergence protocol (PDCP) sequence number (SN) status, and
      receive, based on the bearer context modification request message, a bearer context modification response message from the CU-UP of the base station,
   wherein the bearer context modification response message comprises information associated with the PDCP SN status and information indicating at least one quality of service (QoS) flow, of which a service data adaptation protocol (SDAP) end marker is not received by the CU-UP of the base station.

17. The CU-CP of claim 16, wherein the information associated with the request for the PDCP SN status comprises information used by the CU-CP of the base station to request provision of the PDCP SN status from the CU-UP of the base station.

18. The CU-CP of claim 16, wherein the information indicating the at least one QoS flow, of which the SDAP end marker is not received comprises information indicating the at least one QoS flow, of which the SDAP end marker is not received by the CU-UP of the base station, in case that remapping of a QoS flow to a data radio bearer (DRB) is performed by the CU-CP of the base station.

19. The CU-CP of claim 16, wherein the information indicating the at least one QoS flow, of which the SDAP end marker is not received is included in the bearer context modification response message in response to a handover being performed when the CU-CP of the base station performs remapping of a QoS flow to a data radio bearer (DRB).

20. The CU-CP of claim 16, wherein the at least one processor is further configured to:
receive a bearer context modification required message from the CU-UP of the base station, wherein the bearer context modification required message comprises an identifier of a QoS flow, of which the SDAP end marker is received by the CU-UP of the base station, and
transmit, based on the bearer context modification required message, a bearer context modification confirm message to the CU-UP of the base station.

* * * * *